United States Patent
Greene et al.

(10) Patent No.: US 11,591,101 B2
(45) Date of Patent: Feb. 28, 2023

(54) DIFFUSER FOR ROTATING DETONATION ENGINE

(71) Applicant: UNITED TECHNOLOGIES CORPORATION, Farmington, CT (US)

(72) Inventors: Christopher Britton Greene, Hebron, CT (US); Stuart S. Ochs, Coventry, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 555 days.

(21) Appl. No.: 16/743,966

(22) Filed: Jan. 15, 2020

(65) Prior Publication Data

US 2021/0215098 A1   Jul. 15, 2021

(51) Int. Cl.
| | | |
|---|---|---|
| B64D 33/02 | (2006.01) | |
| F02C 7/04 | (2006.01) | |
| F02K 7/02 | (2006.01) | |

(52) U.S. Cl.
CPC ............. B64D 33/02 (2013.01); F02C 7/04 (2013.01); F02K 7/02 (2013.01); *B64D 2033/0273* (2013.01); *F05D 2250/51* (2013.01); *F05D 2250/71* (2013.01)

(58) Field of Classification Search
CPC ............. B64D 33/02; B64D 2033/026; B64D 2033/0273
See application file for complete search history.

(56) References Cited

U.S. PATENT DOCUMENTS

| | | | |
|---|---|---|---|
| 3,336,753 A | | 8/1967 | Mullen, II et al. |
| 3,543,876 A | * | 12/1970 | Karlson ............... F02K 1/40 |
| | | | 181/220 |
| 4,033,119 A | | 7/1977 | Nichols |
| 4,121,606 A | | 10/1978 | Holland et al. |
| 4,275,857 A | | 6/1981 | Bergsten |
| 5,971,000 A | | 10/1999 | Koncsek et al. |
| 6,584,764 B2 | | 7/2003 | Baker |
| 6,793,175 B1 | | 9/2004 | Sanders et al. |
| 2021/0108801 A1 | * | 4/2021 | Singh .................. F23R 3/002 |

OTHER PUBLICATIONS

European Patent Office, European Search Report dated Jun. 8, 2021 in Application No. 21151423.7.

* cited by examiner

*Primary Examiner* — Nicholas McFall
(74) *Attorney, Agent, or Firm* — Snell & Wilmer L.L.P.

(57) ABSTRACT

A diffuser may comprise an inlet and an outlet. The inlet may comprise an arcuate shape. The outlet may comprise an annular shape. The diffuser may transition from the arcuate shape at the inlet to the annular shape at the outlet. The diffuser may comprise a radially inner wall and a radially outer wall disposed opposite the radially inner wall. The radially inner wall and the radially outer wall may partially define a duct.

19 Claims, 4 Drawing Sheets

SECT A-A

DIFFUSER FOR ROTATING DETONATION ENGINE

GOVERNMENT LICENSE RIGHTS

This invention was made with Government support by the United States. The Government has certain rights in this invention.

FIELD

The present disclosure is directed to diffusers and, more particularly, to diffusers for a rotating detonation engine.

BACKGROUND

A ramjet engine may include a rotating detonation engine having a diffuser to feed the rotating detonation engine. The diffuser may be configured to reduce a flow from a supersonic inlet to subsonic conditions prior to entering the rotating detonation engine. Typical diffusers include a radial duct having an annular shape. Typical diffusers may limit a design space proximate the diffuser.

SUMMARY

A diffuser is disclosed herein. The diffuser may comprise: a radially inner wall including an arc angle, wherein the arc angle increases as the radially inner wall extends axially; a radially outer wall disposed radially outward from the radially inner wall; a first side wall disposed between the radially inner wall and the radially outer wall; and a second side wall disposed between the radially inner wall and the radially outer wall, the second side wall disposed opposite the first side wall, wherein the radially inner wall, the radially outer wall, the first side wall and the second side wall define a duct.

In various embodiments, the radially inner wall and the radially outer wall are separated by a distance, and wherein the distance decrease as the diffuser extends axially. The radially inner wall, the radially outer wall, the first side wall, and the second side wall may define a cross-sectional area of the duct, wherein the cross-sectional area increases as the diffuser extends axially. The diffuser may further comprise an inlet, wherein the radially inner wall and the radially outer wall each comprise an arc angle at the inlet, the arc angle being between 20 degrees and 120 degrees. The diffuser may further comprise an outlet, wherein the outlet comprises and annular shape. The arc angle may increase through a transition portion of the diffuser, the transition portion disposed between the inlet and the outlet. The first side and the second side may merge proximate the outlet forming the annular shape.

A diffuser is disclosed herein. The diffuser may comprise: an inlet comprising a chin portion defining a duct; an outlet disposed axially opposite the inlet, the outlet defining an annular shape; and a transition portion disposed between the inlet and the outlet, wherein the transition portion transitions the chin portion at the inlet to the annular shape at the outlet.

In various embodiments, the diffuser may further comprise a radially inner wall, wherein a radius of curvature of the radially inner wall may increase, decrease or stay the same as the diffuser extends axially through the transition portion from the inlet to the outlet. The diffuser may further comprise a radially inner wall and a radially outer wall separated by a distance, wherein the distance may decrease, increase, or stay the same as the diffuser extends axially through the transition portion from the inlet to the outlet. The inlet may define an axial cross-sectional area, wherein the cross-sectional area increases extends axially. The chin portion may include a radially inner wall, wherein an arc angle of the radially inner wall is between 20 degrees and 120 degrees. The arc angle may increase as the diffuser extends axially through the transition portion from the inlet to the outlet. The diffuser may further comprise a radially inner wall, a radially outer wall, a first side wall and a second side wall, the radially inner wall disposed radially outward from the radially inner wall, the first side wall disposed between the radially inner wall and the radially outer wall, the second side wall disposed between the radially inner wall and the radially outer wall opposite the first side wall, wherein the first side wall and the second side wall merge proximate the outlet.

A vehicle assembly is disclosed herein. The vehicle assembly may comprise: an airframe; a rotating detonation engine disposed within the airframe at an aft end; and a diffuser disposed in the airframe, the diffuser comprising: a radially inner wall and a radially outer wall disposed radially outward from the radially inner wall, the radially inner wall and the radially outer wall partially defining a duct; an inlet having an arc length of the radially inner wall and the radially outer wall between 20 degrees and 120 degrees; and an outlet disposed proximate the rotating detonation engine, the outlet comprising an annular shape.

In various embodiments, the vehicle assembly may further comprise a transition portion disposed between the inlet and the outlet, wherein the arc length of the radially inner wall increases gradually as the diffuser extends from the inlet axially through the transition portion to the outlet. The radially inner wall may comprise a radius of curvature, wherein the radius of curvature decreases, increases, or stays the same as the diffuser extends from the inlet axially through the transition portion to the outlet. A distance between the radially inner wall and the radially outer wall may decrease, increase, or stays the same as the diffuser extends from the inlet axially through the transition portion to the outlet. The diffuser may further comprise a first side wall disposed between the radially inner wall and the radially outer wall at a first arc end and a second side wall disposed between the radially inner wall and the radially outer wall at a second arc end, wherein the second arc end is opposite the first arc end. The first side wall, the second side wall, the radially inner wall and the radially outer wall may define the duct and a cross-sectional area of the duct, wherein the cross-sectional area increases as the diffuser extends from the inlet axially through the transition portion to the outlet.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
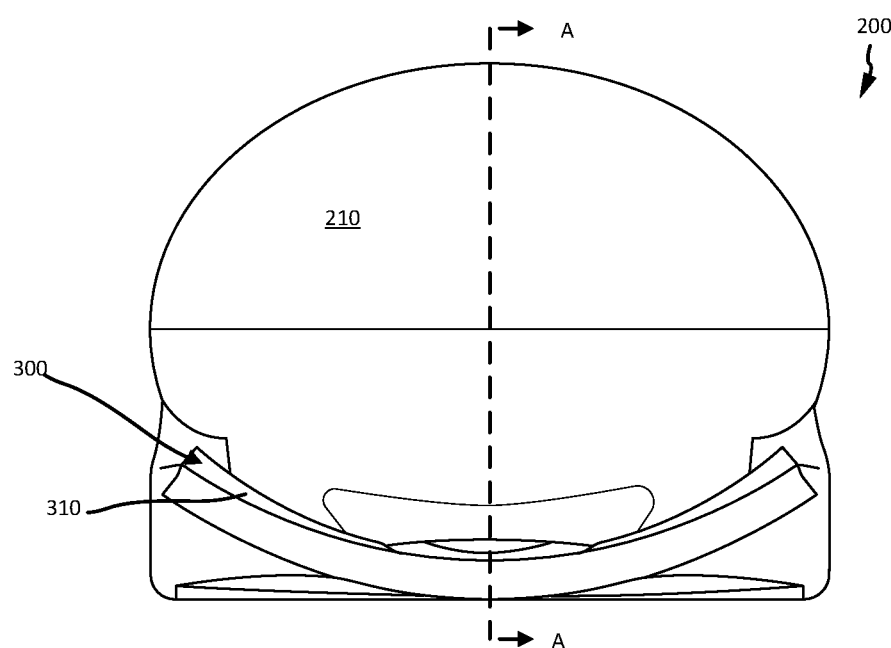
FIG. 1 illustrates a front view of a vehicle assembly, in accordance with various embodiments.

Referring to FIG. 1, a front view of a vehicle assembly 200 is illustrated, in accordance with various embodiments. The vehicle assembly 200 may comprise an airframe 210 and a diffuser 300. The diffuser 300 may be disposed within airframe 210. The diffuser 300 may comprise an inlet 310. The inlet 310 of the diffuser 300 may be configured to receive air flow from the inlet 310 and/or transition supersonic airflow to subsonic airflow. The inlet 310 may comprise an arcuate shape or the like. The diffuser 300 may be configured to feed a rotating detonation engine disposed within the airframe 210.

Figure 2:
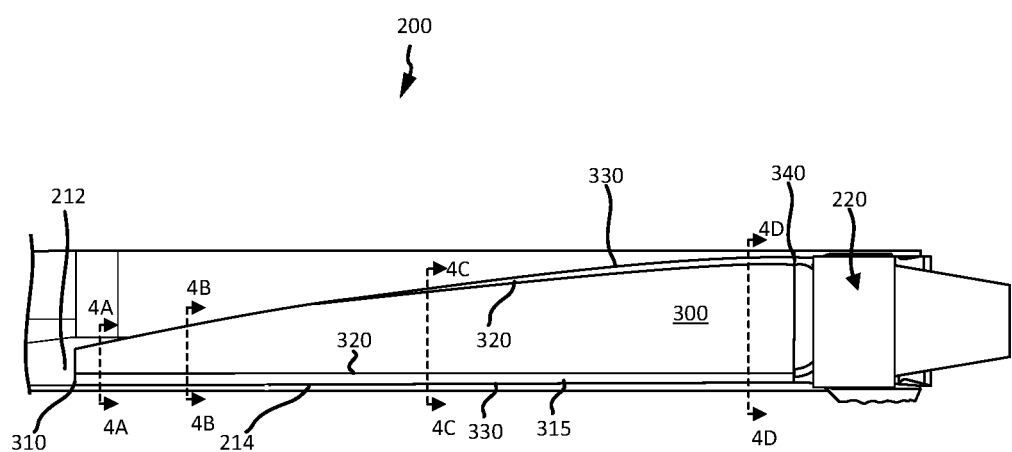
FIG. 2 illustrates a cross section of a vehicle assembly, in accordance with various embodiments.

Referring now to FIG. 2, a cross-sectional view of vehicle assembly 200 along section line A-A from FIG. 2 is illustrated, in accordance with various embodiments. In various embodiments, the airframe 210 of the vehicle assembly 200 may comprise an inlet 212 disposed forward of inlet 310 of the diffuser 300. The vehicle assembly 200 may further comprise a rotating detonation engine 220 disposed at an aft end of vehicle assembly 200.

In various embodiments, the diffuser 300 comprises a radially inner wall 320, a radially outer wall 330, and an outlet 340. The radially inner wall 320 and the radially outer wall 330 may define a duct 315. The duct 315 may receive airflow at inlet 310 and feed the airflow to the rotating detonation engine 220 at the outlet 340. In various embodiments, an arc length of the radially inner wall 320 and the radially outer wall 330 may increase as the diffuser 300 extends axially from the inlet 310 to the outlet 340. In various embodiments, inlet 310 may comprise a chin inlet or the like. Diffuser 300 may provide additional design space within airframe 210. For example, diffuser 300 may provide additional space for fuel, or the like. Extra fuel may allow for greater range. The additional design space may be filled with a larger payload, or the like.

In various embodiments, the outlet 340 may comprise an annular shape. In contrast, the inlet 310 may comprise an arcuate shape. The diffuser may transition from the arcuate shape at the inlet 310 to the annular shape at the outlet 340 gradually as the diffuser extends axially from the inlet 310 to the outlet 340.

In various embodiments, the airframe 210 may comprise an external wall 214. The radially outer wall 330 of the diffuser 300 may be disposed adjacent to the external wall 214 of airframe 210. In various embodiments, the diffuser 300 may abut the external wall 214. In various embodiments, the diffuser 300 may be coupled to the external wall 214 by any method known in the art, such as brazing, welding, or the like.

Figure 3:
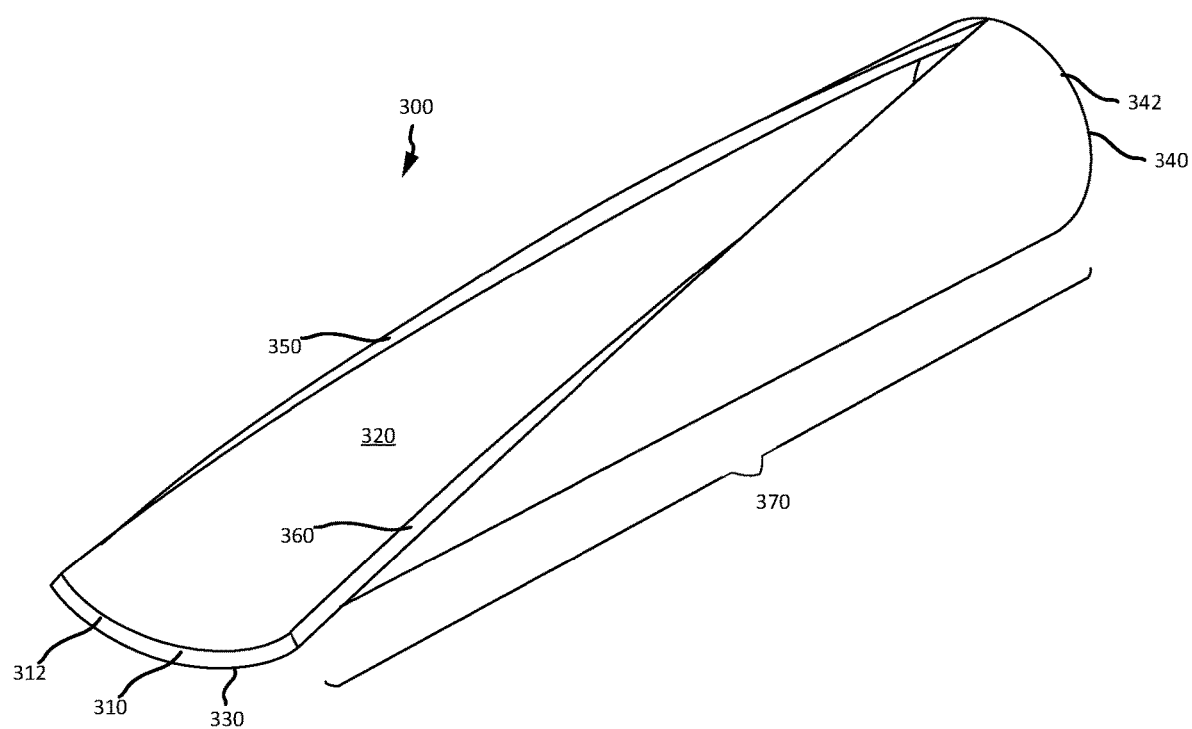
FIG. 3 illustrates a perspective view of a diffuser, in accordance with various embodiments.
Figure 4A:
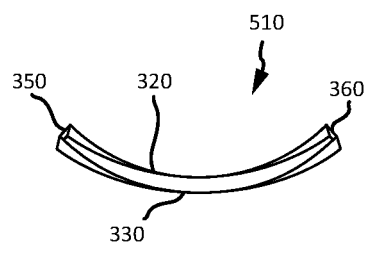
FIGS. 4A, 4B, 4C and 4D illustrate various cross-sectional views of a diffuser at several axial stations from FIG. 2, in accordance with various embodiments.
Figure 4B:
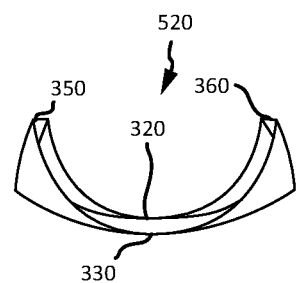
Figure 4C:
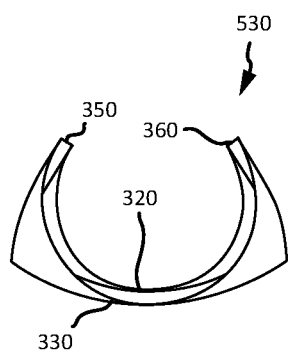
Figure 4D:
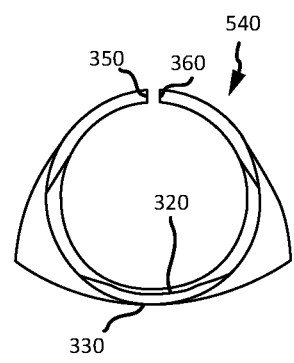

Referring now to FIG. 3, a perspective view of a diffuser 300, in accordance with various embodiments, is illustrated. In various embodiments, the diffuser 300 may further comprise a first side wall 350 extending between the radially inner wall 320 and the radially outer wall 330 on a first side of the diffuser 300. Similarly, the diffuser 300 may further comprise a second side wall 360 disposed between the radially inner wall 320 and the radially outer wall 330 at a second side. The first side wall 350 may be disposed opposite the second side wall 360.

As the diffuser 300 extends axially from the inlet 310 to the outlet 340, an arc angle of the radially inner wall 320 and the radially outer wall 330 may increase gradually until the arc angle is 360 degrees (i.e., annular) at outlet 340. In various embodiments, an arc angle of the radially inner wall 320 and the radially outer wall 330 at the inlet 310 may be between 20 degrees and 120 degrees, or between 45 degrees and 95 degrees, or between 60 degrees and 80 degrees.

In various embodiments, first side wall 350 and second side wall 360 may merge proximate the outlet 340 and form an annular duct portion at outlet 340. In various embodiments, diffuser 300 comprises a chin portion 312 at inlet 310 and an annular portion 342 at outlet 340. Disposed between the chin portion 312 and the annular portion 342 is a transition portion 370 of diffuser 300. In various embodiments, the diffuser 300 may wrap around from chin portion 312 as it extends axially through transition portion 370 to annular portion 342.

The diffuser 300 may be configured for condition airflow from the inlet 310 for a combustor of a rotating detonation engine disposed proximate the outlet 340. As the diffuser extends through transition portion 370, a cross-sectional area of the diffuser may decrease.

Referring now to FIGS. 4A-4D, various axial cross-sections of diffuser 300 at various axial stations, as illustrated in FIG. 2, of diffuser 300 is illustrated, in accordance with various embodiments. First axial station 510 may be disposed proximate inlet 310 (from FIG. 2) along section line 4A-4A. Radially inner wall 320 may comprise a first radius of curvature at first axial station 510. Similarly, radially outer wall 330 may comprise a first radius of curvature at first axial station 510. Additionally, radially outer wall 330 and radially inner wall 320 may be separated by a first distance at first axial station 510, partially defining a duct. The radially outer wall 330, radially inner wall 320, first side wall 350, and second side wall 360 may define a first cross-sectional area at first axial station 510.

Second axial station 520 may be disposed between first axial station 510 and the outlet 340 (from FIG. 2) along section line 4B-4B. Radially inner wall 320 may comprise a second radius of curvature at second axial station 520. Similarly, radially outer wall 330 may comprise a second radius of curvature at second axial station 520. Additionally, radially outer wall 330 and radially inner wall 320 may be separated by a distance at second axial station 520, partially defining the duct. The radially outer wall 330, radially inner wall 320, first side wall 350, and second side wall 360 may define a first cross-sectional area at second axial station 520. In various embodiments, the first radius of curvature of the radially inner wall 320 at first axial station 510 may be less than the second radius of curvature of the radially inner wall 320 at second axial station 520. In various embodiments, the first radius of curvature of the radially outer wall 330 at first axial station 510 may be substantially the same relative to the second radius of curvature of the radially outer wall 330 at the second axial station 520. The first distance between the radially outer wall 330 and the radially inner wall 320 at the first axial station 510 may be greater than the second distance between the radially outer wall 330 and the radially inner wall 320 at the second axial station 520. The second cross-sectional area at second axial station 520 may be substantially equal to, or greater than, the first cross-sectional area at the first axial station 510. "Substantially equal," as defined herein, is between 0 and 2% greater.

Third axial station 530 may be disposed between second axial station 520 and outlet 340 (from FIG. 2) along section line 4C-4C. Radially inner wall 320 may comprise a third radius of curvature at third axial station 530. Similarly, radially outer wall 330 may comprise a third radius of curvature at third axial station 530. Additionally, radially outer wall 330 and radially inner wall 320 may be separated by a third distance at third axial station 530, partially defining the duct. The radially outer wall 330, radially inner wall 320, first side wall 350, and second side wall 360 may define a first cross-sectional area at third axial station 530. In various embodiments, the second radius of curvature of the radially inner wall 320 at second axial station 520 may be less than the third radius of curvature of the radially inner wall 320 at third axial station 530. In various embodiments, the second radius of curvature of the radially outer wall 330 at second axial station 520 may be substantially the same relative to the second radius of curvature of the radially outer wall 330 at the third axial station 530. The second distance between the radially outer wall 330 and the radially inner wall 320 at the second axial station 520 may be greater than the third distance between the radially outer wall 330 and the radially inner wall 320 at the third axial station 530. The third cross-sectional area at third axial station 530 may be substantially equal to, or greater than, the second cross-sectional area at the second axial station 520.

Fourth axial station 540 may be disposed between third axial station 530 and outlet 340 (from FIG. 2) along section line 4D-4D. Radially inner wall 320 may comprise a fourth radius of curvature at fourth axial station 540. Similarly, radially outer wall 330 may comprise a fourth radius of curvature at fourth axial station 540. Additionally, radially outer wall 330 and radially inner wall 320 may be separated by a fourth distance at fourth axial station 540, partially defining the duct. The radially outer wall 330, radially inner wall 320, first side wall 350, and second side wall 360 may define a first cross-sectional area at fourth axial station 540. In various embodiments, the third radius of curvature of the radially inner wall 320 at third axial station 530 may be less than the fourth radius of curvature of the radially inner wall 320 at fourth axial station 540. In various embodiments, the third radius of curvature of the radially outer wall 330 at third axial station 530 may be substantially the same relative to the fourth radius of curvature of the radially outer wall 330 at the fourth axial station 540. The third distance between the radially outer wall 330 and the radially inner wall 320 at the third axial station 530 may be greater than the fourth distance between the radially outer wall 330 and the radially inner wall 320 at the fourth axial station 540. The fourth cross-sectional area at fourth axial station 540 may be substantially equal to, or greater than, the third cross-sectional area at the third axial station 530.

As such, referring back to FIG. 3, as diffuser 300 extends from inlet 310 through transition portion 370 to outlet 340 a distance between the radially inner wall 320 and the radially outer wall 330 may decrease, remain constant, or increase, and/or an axial cross-sectional area of the diffuser may increase.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A diffuser, comprising:
a radially inner wall including an arc angle, wherein the arc angle increases as the radially inner wall extends axially;
a radially outer wall disposed radially outward from the radially inner wall;
a first side wall disposed between the radially inner wall and the radially outer wall; and
a second side wall disposed between the radially inner wall and the radially outer wall, the second side wall disposed opposite the first side wall, wherein:
the radially inner wall, the radially outer wall, the first side wall and the second side wall define a duct therebetween, and
the first side wall and the second side wall merge at an outlet of the duct.

2. The diffuser of claim 1, wherein the radially inner wall, the radially outer wall, the first side wall, and the second side wall define a cross-sectional area of the duct, and wherein the cross-sectional area increases as the diffuser extends axially.

3. The diffuser of claim 1, further comprising an inlet, wherein the arc angle is between 20 degrees and 120 degrees.

4. The diffuser of claim 3, further comprising an outlet, wherein the outlet comprises an annular ring shape.

5. The diffuser of claim 4, wherein the arc angle increases through a transition portion of the diffuser, the transition portion disposed between the inlet and the outlet.

6. The diffuser of claim 4, wherein the first side and the second side wall merge proximate the outlet forming the annular ring shape.

7. A diffuser, comprising:
an inlet comprising a chin portion defining a duct, the inlet defined by a first side wall, a second side wall, a radially inner wall and a radially outer wall;
an outlet disposed axially opposite the inlet, the outlet defining an annular ring shape, the outlet defined radially between the radially inner wall and the radially outer wall of the diffuser; and
a transition portion disposed between the inlet and the outlet, wherein the transition portion transitions from the chin portion at the inlet to the annular ring shape at the outlet wherein the first side wall and the second side wall merge at the outlet of the duct.

8. The diffuser of claim 7, wherein an arc angle of the radially inner wall increases as the diffuser extends axially through the transition portion from the inlet to the outlet.

9. The diffuser of claim 7, wherein the inlet defines an axial cross-sectional area, wherein the axial cross-sectional area increases as the diffuser extends axially through the transition portion from the inlet to the outlet.

10. The diffuser of claim 8, wherein the arc angle of the radially inner wall is between 20 degrees and 120 degrees.

11. The diffuser of claim 10, wherein the arc angle increases as the diffuser extends axially through the transition portion from the inlet to the outlet.

12. The diffuser of claim 7, further comprising the radially outer wall disposed radially outward from the radially inner wall, the first side wall disposed between the radially inner wall and the radially outer wall, the second side wall disposed between the radially inner wall and the radially outer wall opposite the first side wall.

13. The diffuser of claim 12, wherein the first side wall and the second side wall merge proximate the outlet.

14. A vehicle assembly, comprising:
an airframe;
a rotating detonation engine disposed within the airframe at an aft end; and
a diffuser disposed in the airframe, the diffuser comprising:
a radially inner wall and a radially outer wall disposed radially outward from the radially inner wall, the radially inner wall and the radially outer wall partially defining a duct therebetween;
an inlet having an arc angle of the radially inner wall and the radially outer wall between 20 degrees and 120 degrees, the inlet defined by the radially inner wall, the radially outer wall, a first side wall, and a second side wall; and
an outlet disposed proximate the rotating detonation engine, wherein the first side wall and the second side wall merge at the outlet.

15. The vehicle assembly of claim 14, further comprising a transition portion disposed between the inlet and the outlet, wherein an arc length of the radially inner wall increases gradually as the diffuser extends from the inlet axially through the transition portion to the outlet.

16. The vehicle assembly of claim 15, wherein the arc angle of the radially inner wall increases as the diffuser extends from the inlet axially through the transition portion to the outlet.

17. The vehicle assembly of claim 15, wherein the outlet includes an annular shape.

18. The vehicle assembly of claim 15, wherein the first side wall is disposed between the radially inner wall and the radially outer wall at a first arc end, and wherein the second side wall is disposed between the radially inner wall and the radially outer wall at a second arc end, wherein the second arc end is opposite the first arc end.

19. The vehicle assembly of claim 18, wherein the first side wall, the second side wall, the radially inner wall and the radially outer wall define the duct and a cross-sectional area of the duct, and wherein the cross-sectional area increases as the diffuser extends from the inlet axially through the transition portion to the outlet.

\* \* \* \* \*